Patented Aug. 5, 1930

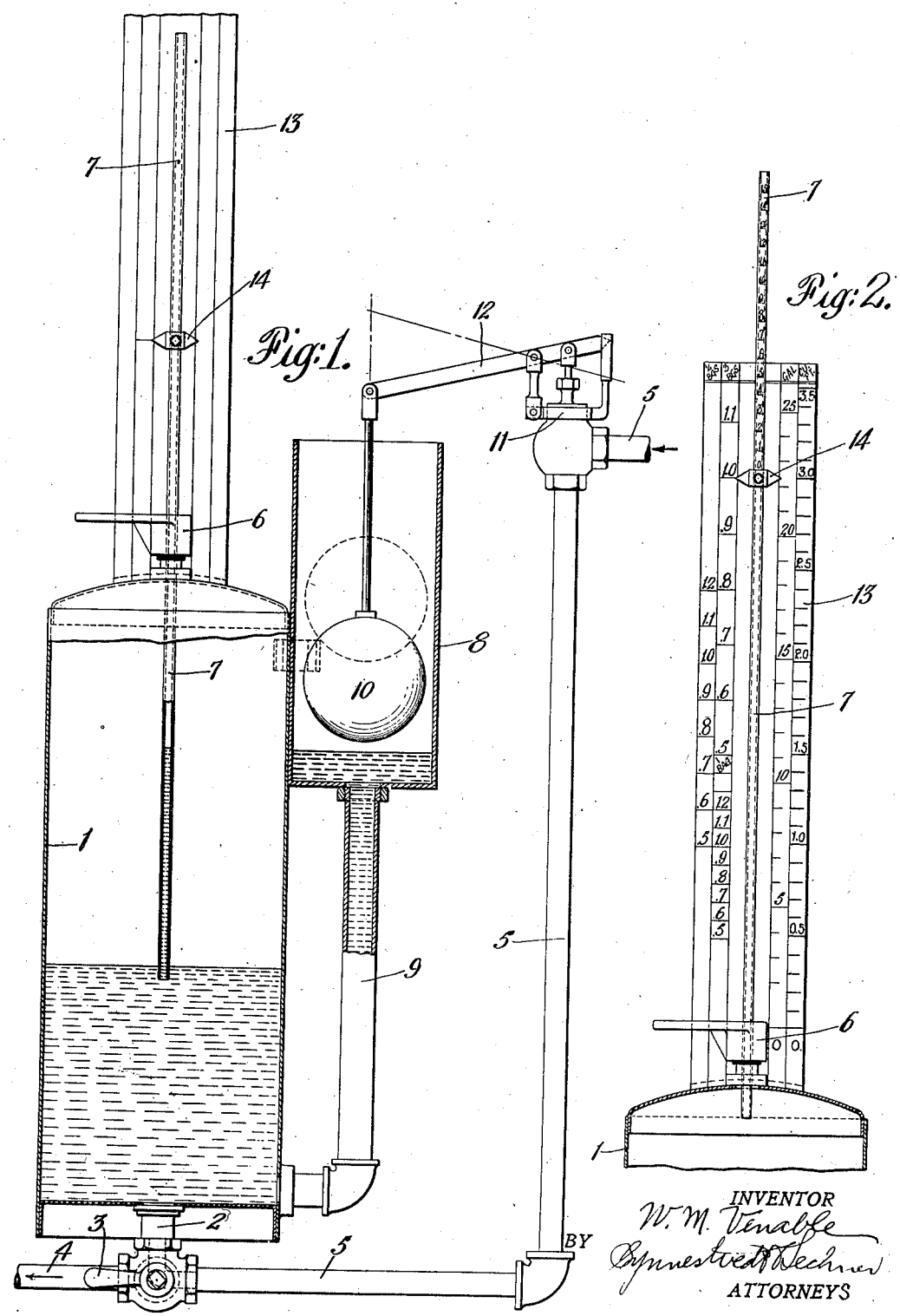

1,772,297

UNITED STATES PATENT OFFICE

WILLIAM MAYO VENABLE, OF PITTSBURGH, PENNSYLVANIA, ASSIGNOR TO BLAW-KNOX COMPANY, OF PITTSBURGH, PENNSYLVANIA, A CORPORATION OF NEW JERSEY

CONCRETE WATER-MEASURING DEVICE

Application filed June 16, 1927. Serial No. 199,165.

This invention relates to a device for measuring out predetermined quantities of water for use in the mixing of batches of concrete. Heretofore, the quantity of water added to a batch of concrete has been more or less carelessly determined although it has been realized for a long time that for given quantities of cement, sand and stone, the amount of mixing water that should be used in order to get the strongest possible concrete is the least amount that will suffice for thorough mixing and subsequent compacting into the smallest possible volume. The greater the proportion of water the more "workable" will be the resulting batch of concrete and in placing concrete in thin slabs or walls and around reinforcing steel it is necessary to use more than the ideal amount of water. In large foundations where tamping is easy, the amount of water can be substantially reduced.

Nevertheless, as stated, until comparatively recently but slight attention has been paid to accurately determining the amount of water in order to produce the strongest possible concrete for the particular job in hand and, broadly speaking, it is the principal object of my invention to provide an exceedingly simple, accurate, efficient and inexpensive device for measuring out whatever quantity of water may have been predetermined as the most desirable for a given batch of concrete.

In carrying out my invention I also provide for convenience and rapidity of operation for, with the device which I have developed, as will more fully appear hereinafter, it is unnecessary for the operator on the job to resort to measurements or calculations of any kind in order to get exactly that amount of water previously determined upon as the best for each batch.

In further considering the objects of my invention it should be borne in mind that there are at present in use two general methods of determining the amount of water required for a batch of concrete. In the first place on very large jobs it is usual to determine by experience just what the proportions of the various ingredients should be. The practice is to take various quantities of sand, cement, stone and water and mix them together thoroughly and then to make sample cylinders from these mixtures and to test the cylinders for strength and other physical properties. From these tests the proportions are chosen which were found to give the best results, and where work is conducted as the result of such test the quantities of sand, stone, cement and water entering into each batch may be specified, the specification reading that so many cubic feet or gallons of water should be used for each batch of concrete containing a given number of bags of cement and a certain number of cubic feet or pounds of sand and stone. In the second place it is now becoming more and more common to specify or to determine the amount of water as a certain proportion of the amount of cement used. Thus it may be specified that the water-cement ratio shall be nine-tenths which means that for every cubic foot of cement (one sack of cement being taken as one cubic foot) there shall be used nine tenths of a cubic foot of water.

Having these two systems in mind as being in common use, it is an object of my invention to provide a device which can be used without change to measure out the predetermined quantity of water regardless of whether such quantity be specified by volume as gallons or cubic feet or by ratio to cement.

Furthermore, as there is always a certain amount of water introduced into a batch of concrete with the stone and sand used, it is customary to make allowance for this moisture in determining upon the amount of water to be added and it is also an object of my invention to provide a measuring device of the character described by means of which this allowance can be readly taken care of.

More specifically stated, I propose to provide an apparatus including a tank by means of which the amount of water which can be withdrawn or discharged from the tank will always be the same for each batch of concrete and which can be readily predetermined in accordance with the theories already set forth.

It is a further object of my invention to provide a sliding gauge member projecting into a tank by means of which the quantity of water to be discharged from the tank can be accurately predetermined together with suitable indicator, scale or chart devices associated with such gauge member by means of which said member can be set.

With the foregoing in mind I will now describe the preferred embodiment of my invention which is illustrated in the accompanying drawing, wherein Fig. 1 is a side elevation of the apparatus as a whole with certain portions, however, in section in order to show the water levels; and Fig. 2 is a similar view of the upper portion of the device illustrating in detail the scales or charts used in association with the gauge member.

As seen the device includes an air-tight tank 1 which communicates at the bottom thru a pipe 2 with a three-way valve 3 of any ordinary construction. With the handle of the three-way valve in the position indicated in the drawing, any water in the tank can be discharged thru the discharge pipe 4, inflow from the supply pipe 5 being shut off. By turning the handle 3 to its opposite or right-hand position, discharge from the tank can be cut off and inflow from the pipe 5 established.

Thru a suitable seal 6 in the top of the tank I project down into the tank the gauge member 7 which, in this instance, takes the form of an open-ended tube. By suitably turning the seal 6 the sealing pressure on the tube 7 can be sufficiently relieved to permit vertical or up and down adjustment of the gauge member 7 in order to vary the distance between its lower end and the bottom of the tank.

Associated with the tank is a float chamber 8 which, in the embodiment shown, I place in communication with the water in the tank 1 by means of the pipe 9. The float 10 in this chamber operates a shut-off valve mechanism 11 in the supply pipe 5 thru the medium of the lever mechanism 12. Inasmuch as devices of this kind are quite common and well understood in the art, no attempt has been made to illustrate or describe its details.

In operation the device is used as follows. The gauge member 7 is adjusted as will be described hereinafter and the handle of the three-way valve 3 is turned to the position which will establish communication between the supply pipe 5 and the tank 1, which position at the same time shuts off communication with the discharge pipe 4. Water will now flow into the tank until it reaches the level of the bottom of the gauge member 7, the air during the filling operation passing out thru the hollow interior of the member 7. Since the tank is an air-tight one just as soon as the water touches the bottom of the tube 7 the outlet for the air is cut off and the water cannot rise any farther in the tank because of the air trapped in the upper portion thereof. The water may rise very slightly above the bottom of the gauge member 7 within the tank 1 depending somewhat upon the pressure under which it is being introduced but in any event the distance will be negligible and can be readily computed in determining the amount of water which enters the tank.

As the water is still turned on after the level in the tank has reached the bottom of the gauge member 7, it will continue to rise within the tube 7 as well as in the communicating pipe 9 and the float chamber 8. When the float reaches approximately the dotted line position indicated in the drawing, the shut-off valve 11 will be closed and the supply of water will be cut off.

Knowing the sizes of the various parts it will be readily understood that the amount of water in the system can be very accurately estimated. It will also be apparent that the only thing which it is necessary for the operator to do in using the device once it has been set is to manipulate the handle of the three-way valve 3.

With the foregoing in mind it will readily be seen that by means of a suitable scale member 13 the gauge member 7 can be easily adjusted so that the amount of water to be withdrawn from the tank can be predetermined with exceeding simplicity and accuracy.

By referring to Fig. 2 it will be seen that the scale is calibrated to give readings in any one of the three general methods of specifying the water content of a batch of concrete now in common use. The right-hand column shows the water in cubic feet, the column next to the left shows it in gallons, the left hand column shows the water cement-ratio where two bags of cement are to be used and the column next thereto is divided into an upper and a lower portion, the lower one of which gives a reading of the water where the water cement-ratio is specified and the amount of cement to be used in a batch is one bag and the upper portion of the same column doing the same thing where the number of bags of cement to be used is three.

The gauge member 7 carries a movable indicator 14 for a purpose which will now be described. As previously indicated a certain amount of water is nearly always introduced with stone and sand and it is customary in careful work to take this moisture content of the stone and sand into consideration in determining the amount of water to be added. The amount of water contained in the sand and stone is determined from time to time by taking samples of the material and measuring the contained water. This is generally found to be reasonably constant from batch to batch during an ordinary day's run which enables an allowance to be safely made therefor. When the indicator 14 is clamped to the gauge member at a higher elevation, the amount of water to be discharged from the tank will, of course, be less for any given setting on the scale 13. The scale and the gauge can be calibrated in cubic feet if so desired and if a test has determined that about one half of a cubic foot of water enters each batch with the stone and sand being used, the operator sets the indicator on the tube at the reading .5 and then moves the tube so that the indicator is brought to the point on the scale which shows the amount of water specified according to any one of the methods now in common use, namely in cubic feet, gallons or water-cement ratio depending upon the number of bags of cement specified.

It will therefore be apparent that with the device which I have disclosed it is exceedingly easy to measure out accurately and rapidly the amount of water necessary for a batch of concrete regardless of the particular method of measuring such water specified for the particular job in hand.

It will be understood, of course, that the gauge member together with the associated scales or charts could be readily applied to apparatus of varying designs and I wish it to be understood that my invention is not to be limited to the particular design disclosed. For instance, I may provide a pipe large enough to act as an overflow pipe adjustably projected through the bottom of the tank together with means for shutting off the water when the point of overflow is reached. This overflow pipe could carry a suitable indicator adapted to give a reading on a scale or chart like the one described above.

I claim:—

1. In an apparatus for measuring the water to be used in a batch of concrete, the combination of a tank, a fixed scale, a sliding gauge member projecting into the tank for predetermining the quantity of water to be discharged therefrom, and a scale on said gauge member, calibrated in terms of the amount of water found in the solid constituents of the batch, said gauge being set by both of said scales in cooperation to predetermine the discharge of water as aforesaid.

2. In an apparatus for measuring the water to be used in a batch of concrete, the combination of a tank, a sliding gauge member projecting into the tank for predetermining the quantity of water to be discharged therefrom, and a scale by means of which said gauge member is set, said scale being calibrated so as to give a reading of the water in terms of cubic feet, gallons and cement-ratio.

3. In an apparatus for measuring the water to be used in a batch of concrete, the combination of a tank, a sliding gauge member projecting into the tank for predetermining the quantity of water to be discharged therefrom, and a scale by means of which said gauge member is set, said scale being calibrated so as to give a reading of the water in terms of cement-ratio.

4. In an apparatus for measuring the water to be used in a batch of concrete, the combination of a tank, a sliding gauge member projecting into the tank for predetermining the quantity of water to be discharged therefrom, and a scale of said gauge member, calibrated in terms of the amount of water found in a solid constituent of the batch.

5. In an apparatus for measuring the water to be used in a batch of concrete, the combination of a tank, a sliding gauge member projecting into the tank for predetermining the quantity of water to be discharged therefrom, a cement-ratio scale fixed with relation to said gauge member, and a scale on the gauge member, calibrated in terms of the amount of water found in a solid constituent of the batch, said gauge being adapted to be set by both of said scales in cooperation to predetermine the discharge of water as aforesaid.

6. In an apparatus for measuring the water to be used in a batch of concrete, the combination of a tank, a sliding gauge member projecting into the tank for predetermining the quantity of water to be discharged therefrom, a water scale fixed with relation to said gauge member, a scale on the gauge member, calibrated in terms of the amount of water found in a solid constituent of the batch, and an adjustable indicator on said gauge scale, said gauge member being adapted to be set by adjusting said gauge scale indicator to the required point on the gauge scale and moving said gauge member so as to bring the said indicator to the proper point on the fixed water scale.

7. In an apparatus for measuring the water to be used in a batch of concrete, the combination of a tank, water supply means and water discharge means for the tank, a scale calibrated in terms of the water to be discharged, a second scale calibrated in terms of the amount of water found in a solid constituent of the batch, one of said scales being movable, and indicating means adapted to be set by both of said scales in cooperation to designate the amount of water to be discharged from the tank.

8. In an apparatus for measuring the water to be used in a batch of concrete, the combination of a tank, water supply means and water discharge means for the tank, a fixed scale calibrated in terms of the water to be discharged, a movable scale calibrated in terms of the amount of water found in a solid constituent of the batch, and indicating means adapted to be set by both of said scales in cooperation to designate the amount of water to be discharged from the tank.

9. In an apparatus for measuring the water to be used in a batch of concrete, the combination of a tank, a water supply conduit, a float actuated valve for shutting off said supply conduit when the tank has been filled to a predetermined level, a valve controlled discharge conduit, a scale calibrated in terms of the water to be discharged, a second scale calibrated in terms of the amount of water found in a solid constituent of the batch, one of said scales being movable, and indicating means adapted to be set by both of said scales in cooperation to designate the amount of water to be discharged from the tank.

10. In an apparatus for measuring the water to be used in a batch of concrete, the combination of a tank, water supply means and water discharge means for the tank, a scale calibrated in terms of the water to be discharged by volume and by cement ratio, a second scale calibrated in terms of the amount of water found in a solid constituent of the batch, one of said scales being movable, and indicating means adapted to be set by both of said scales in cooperation to designate the amount of water to be discharged from the tank.

11. In an apparatus for measuring the water to be used in a batch of concrete, the combination of a tank, water supply means and water discharge means for the tank, indicator means for designating the amount of water to be discharged from the tank, and a scale upon which said indicator means registers, said scale being calibrated so as to give a reading of the water in terms of volume and of cement-ratio.

12. In an apparatus for measuring the water to be used in a batch of concrete, the combination of a tank, a sliding gauge member projecting into the tank for predetermining the quantity of water to be discharged therefrom, and a scale by means of which said gauge member is set, said scale being calibrated so as to give a reading of the water in terms of volume and of cement-ratio.

In testimony whereof I have hereunto signed my name.

WILLIAM MAYO VENABLE.